United States Patent [19]
Matsuoka et al.

[11] Patent Number: 5,953,094
[45] Date of Patent: Sep. 14, 1999

[54] LIQUID CRYSTAL DISPLAY DEVICE

[75] Inventors: Hideki Matsuoka, Gifu; Takao Suzuki; Norio Oku, both of Gifu-ken; Minoru Nakano, Tokyo; Susumu Oima, Gifu-ken; Kazuto Noritake, Gifu, all of Japan

[73] Assignees: Sanyo Electric Co., Ltd.; Sony Corporation, both of Japan

[21] Appl. No.: 09/049,525

[22] Filed: Mar. 27, 1998

[30] Foreign Application Priority Data

Apr. 4, 1997 [JP] Japan ................................ 8-086997
Apr. 8, 1997 [JP] Japan ................................ 8-089482

[51] Int. Cl.$^6$ ................ G02F 1/1333; G02F 1/1339; G02F 1/1345

[52] U.S. Cl. ............................ 349/153; 399/122; 399/149

[58] Field of Search .................. 399/139, 153, 399/122, 138

[56] References Cited

U.S. PATENT DOCUMENTS

| | | | |
|---|---|---|---|
| 4,767,189 | 8/1988 | Hayashi et al. | 349/149 |
| 5,535,030 | 7/1996 | Ogura et al. | 349/152 |
| 5,576,869 | 11/1996 | Yoshida | 349/149 |
| 5,619,358 | 4/1997 | Tanaka et al. | 349/153 |
| 5,739,888 | 4/1998 | Ogura et al. | 349/153 |
| 5,822,030 | 10/1998 | Uchiyama | 349/149 |

*Primary Examiner*—William L. Sikes
*Assistant Examiner*—Toan Ton
*Attorney, Agent, or Firm*—Sheridan Ross P.C.

[57] ABSTRACT

A liquid crystal display device has a liquid crystal layer formed between first and second insulating substrates. A wiring layer, an insulation film and a first orientation layer are formed on the first substrate between it and the liquid crystal layer. A electrode layer and a second orientation film are formed on the second substrate between it and the liquid crystal layer. The wiring layer includes grooves along its peripheral portion which allow the insulation film to contact the first substrate, which promotes bonding and inhibits peeling of the insulation film from the wiring layer.

7 Claims, 9 Drawing Sheets

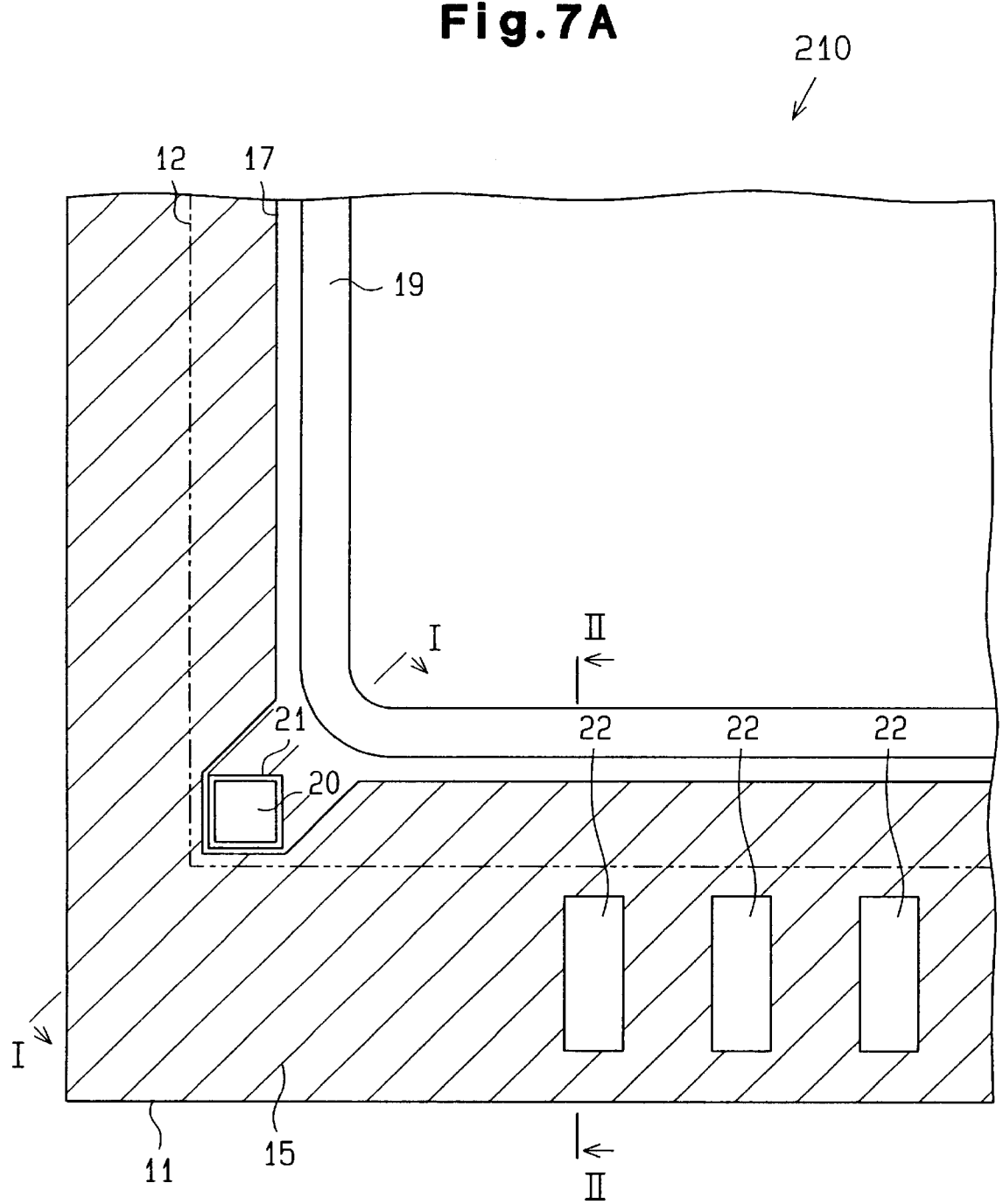

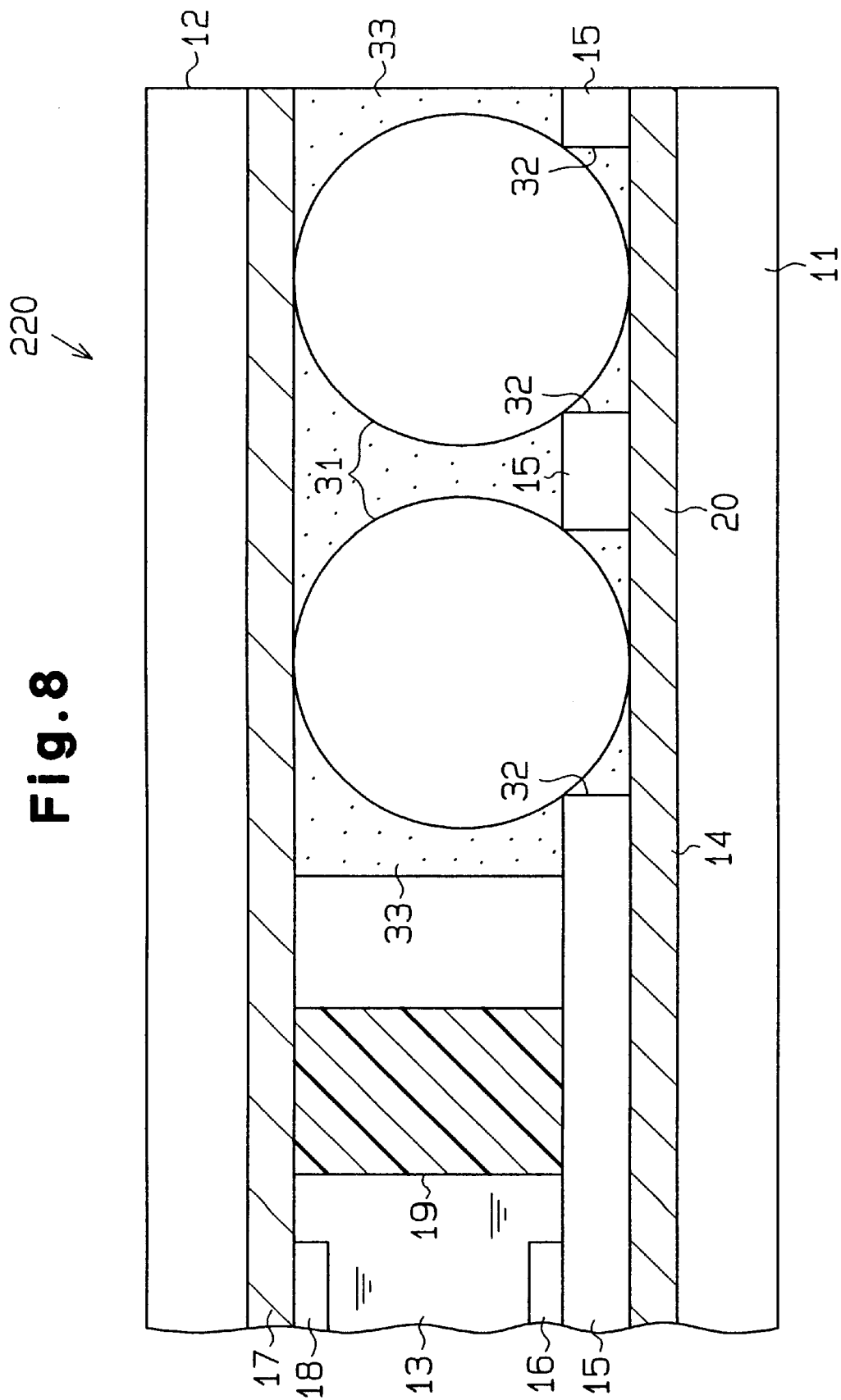

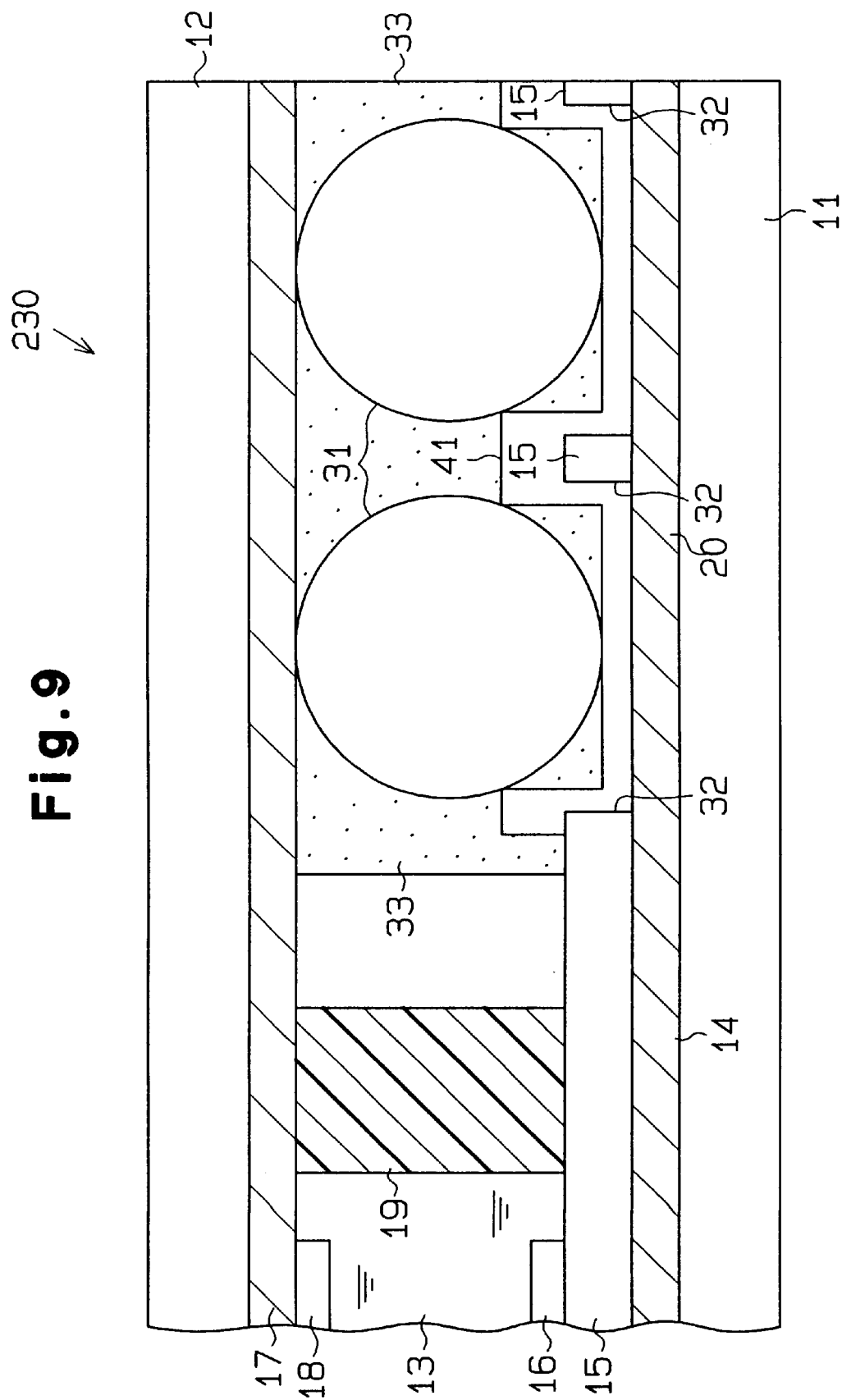

LIQUID CRYSTAL DISPLAY DEVICE

BACKGROUND OF INVENTION

The present invention relates to a liquid crystal display device, and more particularly, to a liquid crystal display device which prevents stripping or corrosion of a wiring layer formed on a peripheral portion of an insulative substrate.

FIG. 1 is a schematic block diagram of a conventional active matrix type liquid crystal display device. The pixel portion (display panel) 101 comprises a plurality of scanning lines (gate wiring) G1–Gm, a plurality of data lines (drain wiring) D1–Dm crossing orthogonally with the gate wiring G1–Gm, and pixels 102 provided at each of the intersections of the gate wirings and the drain wirings. A gate signal (a scanning signal) from a gate driver 103 is applied to the gate wirings G1–Gm. A data signal (a video signal) from a drain driver (data driver ) 104 is applied to the drain wirings D1–Dm. The gate and drain drivers 103 and 104 form a peripheral driver circuit 105. A liquid crystal display device which comprises the driver 103 or 104 and the pixel portion 101 formed on an insulative substrate 11 (FIG. 3) is generally called a driver built-in liquid crystal display device. The gate driver 103 may be provided on both sides of the pixel portion 101. The drain driver 104 may be provided on both sides of the pixel portion 101.

FIG. 2 is an equivalent circuit diagram of one of the pixels 102. The pixel 102 comprise an TFT (Thin Film Transistor) 106 as a pixel drive element, a liquid crystal cell LC and a supplementary capacitor (a storage capacitor or an additional capacitor) SC. The gate wiring Gn is connected to the gate of the TFT 106, and the drain wiring Dn is connected to the drain of TFT 106. The source of the TFT 106 is connected to the supplementary capacitor SC and a display electrode (pixel electrode) 107 of the liquid crystal cell LC. The liquid crystal cell LC and the supplementary capacitor SC form a signal storage element. An opposite electrode (common electrode) 108, which is arranged opposite to the display electrode 107 of the liquid crystal cell LC, receives a voltage Vcom. The supplementary capacitor SC comprises a storage electrode 109 connected to the source of the TFT 106 and a supplementary capacitor electrode 110 to which a constant voltage VR is applied. The opposite electrode 108 of the liquid crystal cell LC is common to all of the pixels 102. Static capacity is formed between the display electrode 107 and the opposite electrode 108. The supplementary capacitor electrode 110 may be alternatively connected to the adjacent gate wiring Gn+1.

FIG. 3 is a partial cross sectional view of the conventional display panel 101. A liquid crystal layer 13 is provided between opposing first and second insulative substrates 11 and 12 which are preferably made of transparent glass material. An aluminum alloy film 14 which forms a wiring layer, a planarizing insulation film 15 preferably made of acrylic resin and an orientation film 16 preferably made of polyimide resin are laminated on the first substrate 11. An opposite electrode 17 (i.e., the opposite electrode 108) preferably made of ITO (Indium Tin oxide) and a second orientation film 18 preferably made of polyimide resin are laminated on the second substrate 12. A sealing material 19 preferably an epoxy resin is provided between the insulative substrates 11 and 12 to prevent leakage of the liquid crystal layer 13. Specifically, the sealing material 19 is provided between the orientation films 16 and 18 at the peripheral portions of the substrates 11 and 12.

On the peripheral portions of the insulative substrates 11 and 12 to which the sealing material 19 is provided, the aluminum alloy film 14 is formed all over the first insulative substrate 11. Adhesion strength of the aluminum alloy film 14 to the planarizing insulation film 15 is lower than that of the planarizing insulation film 15 to the insulative substrate 11. Therefore, the planarizing insulation film 15 may easily peel off the aluminum alloy film 14.

FIG. 4 is a partial cross sectional view of a second conventional liquid crystal display device in which the aluminum alloy film 14 is formed as a lead wiring on the peripheral portion of the insulative substrate 11. The sealing material 19 is formed between the opposite electrode 17 and the planarizing insulation film 15 to enclose liquid crystal layer 13 and the orientation films 16 and 18 at the peripheral portions of the insulative substrates 11 and 12.

A portion of the aluminum alloy film 14 forms a contact pad 20. The contact pad 20 may be made of a different material from the aluminum alloy film 14. The opposite electrode 17 is formed to extend to the edge of the substrate 12, and an extended portion of the opposite electrode 17 is connected to the contact pad 20 via a conductive material 21. The conductive material 21 is preferably made of resin mixed with conductive material. The contact pad 20 receives a voltage Vcom via the input terminal (not shown) of the lead wiring of the aluminum alloy film 14. The voltage Vcom is applied to the opposite electrode 17 via the conductive material 21.

Various input terminals (a power supply input terminal of voltage Vcom or VR, a power supply input terminal of the peripheral drive circuit 105 and an input terminal of the data signal) are concentrated on the lead wiring of the aluminum alloy film 14. The arrangement of the input terminals facilitates drawing wirings of an equipment when the liquid crystal display device is mounted into various apparatus, such as a personal computer, a word processor, an electronic notebook, or a television display monitor.

The area of the contact pad 20 provided on the peripheral portion of the insulative substrate 11 is larger than the area necessary to connect the liquid crystal display device with an external circuit and is exposed out of the peripheral portion of the substrate 11. If the exposed portion of the contact pad 20 is exposed to air, it may cause corrosion of the aluminum alloy film 14 of the contact pad 20. Moreover, moisture or contaminants in the air may penetrate between the contact pad 20 and the conductive material 21, adversely affecting the liquid crystal layer 13 and the TFT 106.

It is an object of the present invention to provide a liquid crystal display device which prevents stripping of the insulation film from the wring layer.

It is a secondary object of the present invention to provide a liquid crystal display device which prevents corrosion of the wiring layer and penetration of moisture or contaminants.

SUMMARY OF THE INVENTION

Briefly stated, the present invention provides a liquid crystal display device. The liquid crystal display device includes first and second insulative substrates arranged opposite to each other. A liquid crystal layer is provided between the first and second insulative substrates. A supplementary layer is located on the first insulative substrate. The supplementary layer has at least one slit formed near a peripheral portion thereof which exposes a portion of the first insulative substrate. A planarizing insulation film is located on the supplementary layer and on the exposed portion of the first insulative substrate. A sealing material is provided between the planarizing insulation film and the second insulative substrate to seal the liquid crystal layer.

The present invention provides a liquid crystal display device including first and second insulative substrates arranged opposite to each other. A crystal layer is provided between the first and second insulative substrates. A wiring layer is located on the first insulative substrate. A contact pad is located on a peripheral portion of the first insulative substrate and electrically connected to the wiring layer. A common electrode is located on the second insulative substrate. A conductive material is provided between the first and second insulative substrates to electrically connect the common electrode and the contact pad. An insulation film is located on the wiring layer and covers around a contact portion between the contact pad and the conductive material.

Other aspects and advantages of the invention will become apparent from the following description, take in conjunction with the accompanying drawings, illustrating by way of example the principles of the invention.

BRIEF DESCRIPTION OF THE DRAWINGS

The present invention, together with objectives and advantages thereof, may best be understood by reference to the following description of the presently preferred embodiments together with the accompanying drawings in which:

FIG. 7A is a partial cross-sectional view of a liquid crystal display device according to a second embodiment of the present invention;

FIG. 8 is a partial cross-sectional view of a liquid crystal display device according to a third embodiment of the present invention; and FIG. 9 is a partial cross-sectional view of a liquid crystal display device according to a fourth embodiment of the present invention.

DETAILED DESCRIPTION OF THE PREFERRED EMBODIMENTS

Figure 5:
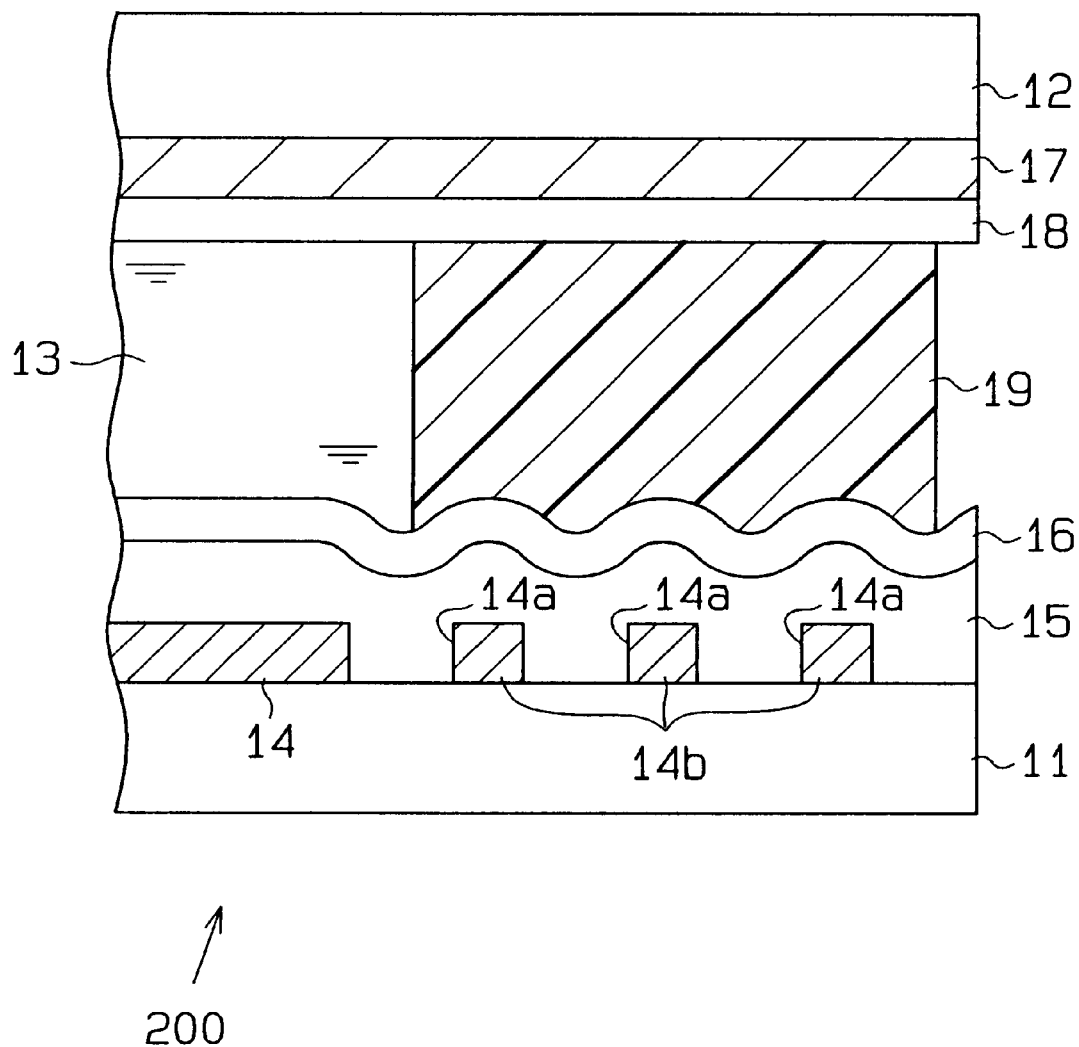
FIG. 5 is a partial cross-sectional view of a liquid crystal display device according to a first embodiment of the present invention.

In the drawings, like numerals indicate like elements throughout. Referring to FIG. 5, a liquid crystal display device 200 according to a first embodiment of the present invention includes a plurality of slits 14a formed on an area of the aluminum alloy film 14 corresponding to the peripheral portion (the sealing area) of the first insulative substrate 11 on which the sealing material 19 is provided. More specifically, the sealing material 19 is provided at the peripheral portion of the first and second transparent insulative substrates 11 and 12. A plurality of projections 14b preferably made of the aluminum alloy film are formed on a seal forming area of the first substrate 11 below the sealing material 19.

The surface of the first substrate 11 is exposed by the slits 14a cut in the aluminum alloy film 14. Accordingly, the exposed surface (the area of each slit 14a) of the first substrate 11 is directly contacted with the planarizing insulation film 15. Thus, the contacting area between the first substrate 11 and the planarizing insulation film 15 is increased in order to prevent peeling off of the planarizing insulation film 15 from the aluminum alloy film 14 in the seal forming area of the peripheral portion of the first substrate 11. As a result, defective displaying of images on the display device 200 caused by peeling-off of the film 15 is prevented.

Figure 6:
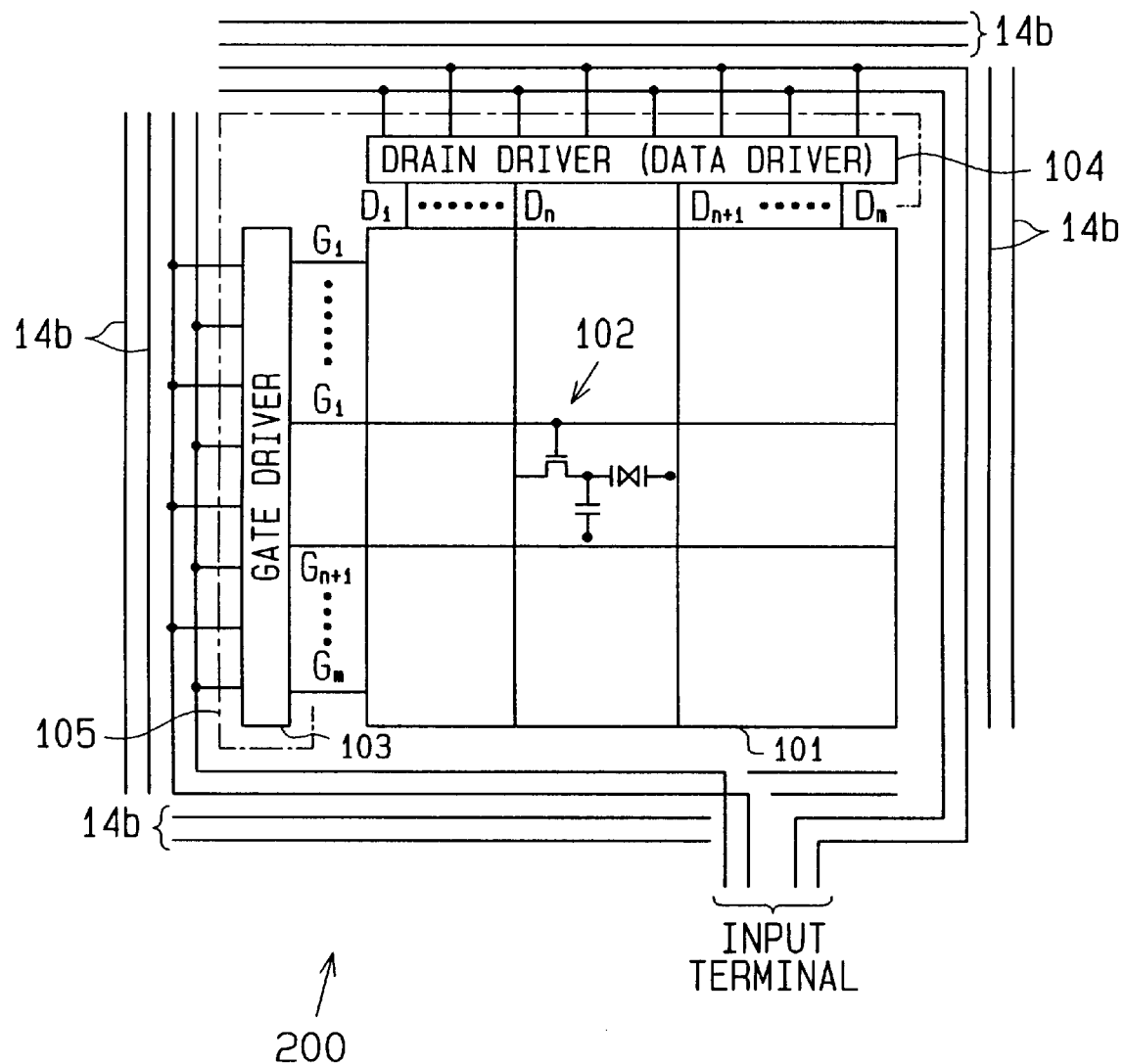
FIG. 6 is a schematic diagram of an insulative substrate of the liquid crystal display device of FIG. 5.

In the liquid crystal display device 200, as shown in FIG. 6, the projections 14b form lead wirings for the gate driver 103 and the drain driver 104.

Figure 7B:
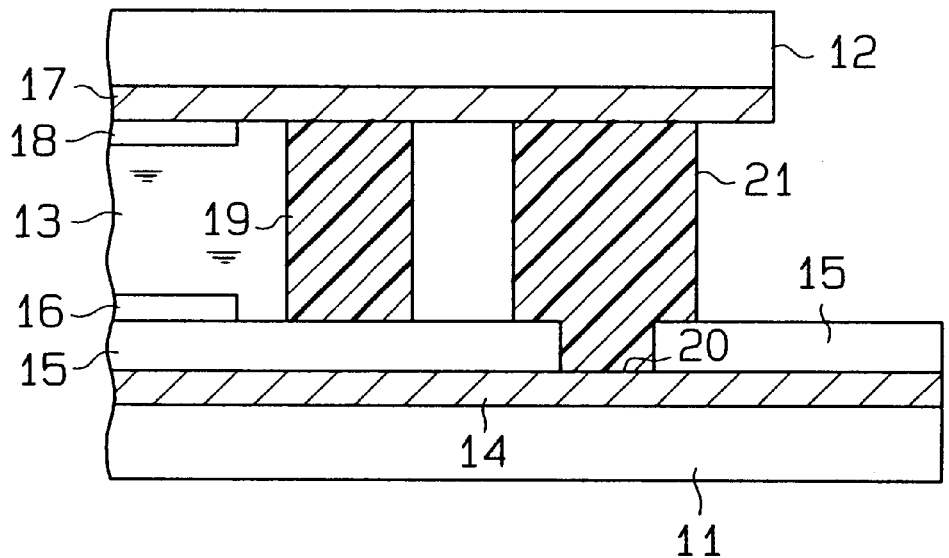
FIG. 7B is a partial cross-sectional view of the liquid crystal display device along line I—I of FIG. 7A.
Figure 7C:
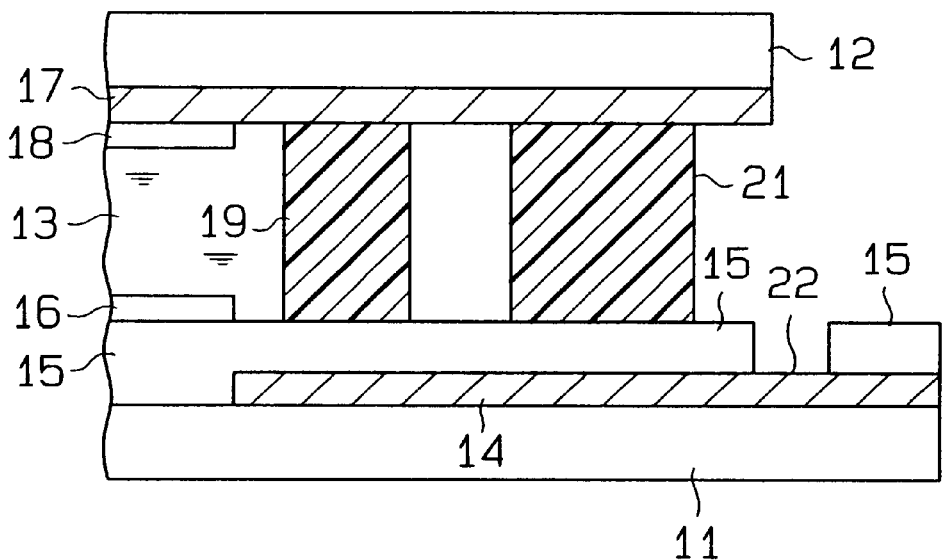
FIG. 7C is a partial cross-sectional view of the liquid crystal display device along line II—II of FIG. 7A.

A liquid crystal display device 210 according to a second embodiment of the present invention, as shown in FIGS. 7A–7C, has a portion of the surface of the aluminum alloy film 14 excluding a first contact pad 20 and one or more second contact pads 22 covered by the insulation film 15 near the edge of the first substrate 11. The first contact pad 20 is electrically connected to the opposite electrode 17 via the conductive material 21, and the second pads 22 are electrically connected an external circuit(not shown). In other words, the covered surface of the aluminum alloy film 14 is not used for the external connection. Therefore, the covered surface of the aluminum alloy film 14 is not exposed to air so that the aluminum alloy film 14 is protected from corrosion. In the second embodiment, a portion of the insulation film 15 is eliminated to ensure a good connection between the contact pad 20 and conductive material 21. The insulation film 15 is preferably made of silicon oxide, SOG (Spin On Glass), various silicate glass (BSG, PSG, or BPSG), silicon nitride or various kinds of organic insulating film. Since the contacting faces between the contact pad 20 and the conductive material 21 are protected by the insulation film 15, the possibility that moisture or contaminants in air penetrating into the contacting faces is eliminated. That is, moisture or contaminants are prevented from penetrating the liquid crystal layer 13 or the TFT 106 provided on the first insulative substrate 11. As a result, the reliability of the liquid crystal display device 210 is improved.

Referring to FIG. 8, a liquid crystal display device 220 according to a third embodiment of the present invention is characterized by the following four structural features:

(1) A plurality of spherical particles (conductive beads) 31 are provided instead of the conductive material 21. The surface of each bead 31 is preferably coated with a conductive material, such as gold (Au). Such beads 31 are commercially available (e.g., "Microperl" manufactured by Sekisui-Kagaku of Japan).

More specifically, the opposite electrode 17 (108) of the liquid crystal cell LC is extended to the edge of the second insulative substrate 12 and the extended portion of the opposite electrode 17 is connected to the contact pad 20 via the conductive beads 31. The contact pad 20 receives a voltage Vcom via the input terminal (not shown) of the lead wiring of the aluminum alloy film 14. The voltage Vcom is applied to the opposite electrode 17 via the conductive material coated on the surface of each conductive bead 31.

(2) A portion of the contact pad 20 which is exposed at the edge of the first insulative substrate 11 and is not used to connect with the external circuit is covered by the insulation film 15. That is, the portion of the contact pad 20 unnecessary for the external connection is not exposed.

(3) Contact holes 32 are provided at positions corresponding to the conductive beads 31, respectively. The diameter of the contact hole 32 is preferably large enough not to allow movement of the conductive bead 31 when it is fit into the hole 32. That is, each conductive bead 31 is fixed when it is fit into the contact hole 32.

(4) A resin 33 is filled in the space in which the conductive beads 31 are provided between the first and second transparent insulative substrates 11 and 12. The resin 33 is preferably moisture resistant. Therefore, contact portions between the contact pad 20 and the conductive beads 31 are protected by the resin 33 and the insulation film 15.

Figure 1:
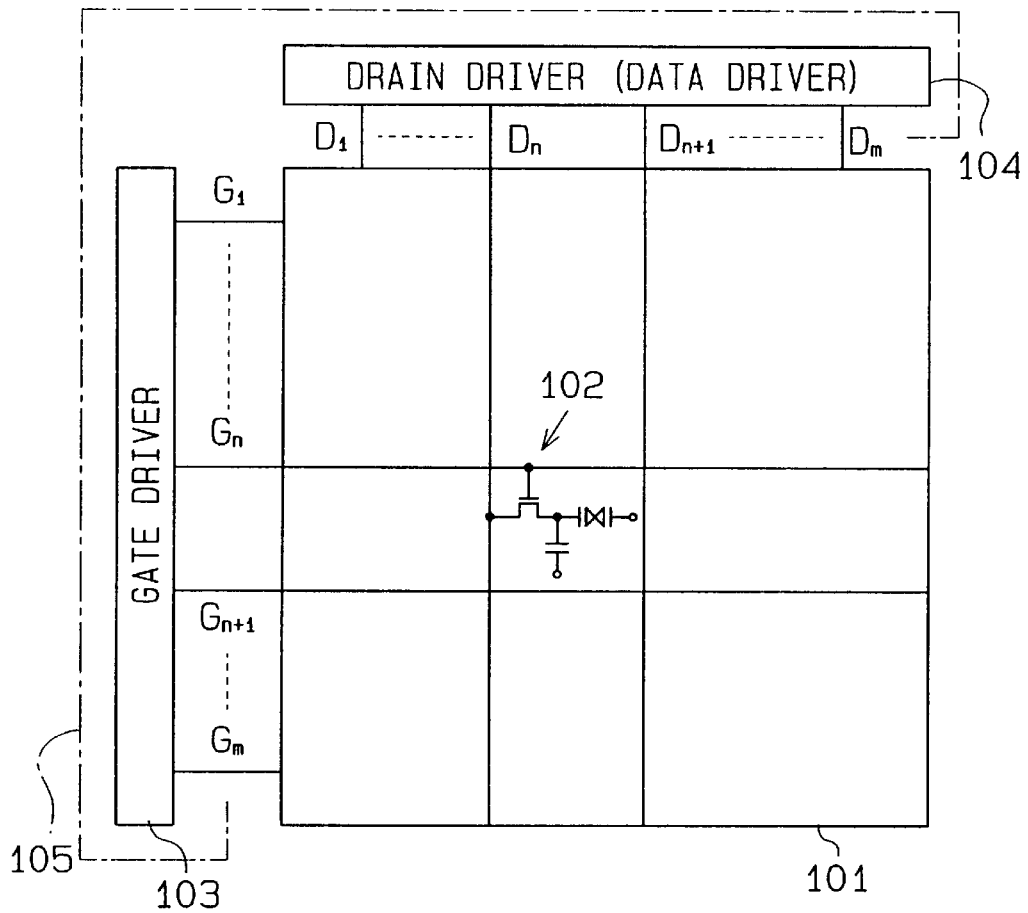
FIG. 1 is a schematic block diagram of a conventional liquid crystal display device.
Figure 2:
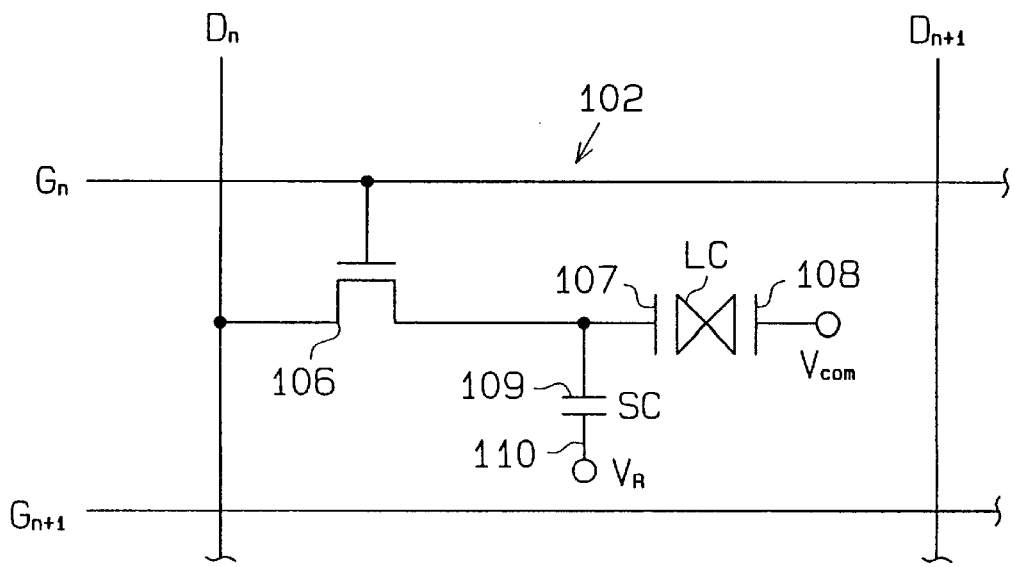
FIG. 2 is an equivalent circuit diagram of a liquid crystal cell of the liquid crystal display device of FIG. 1.
Figure 3:
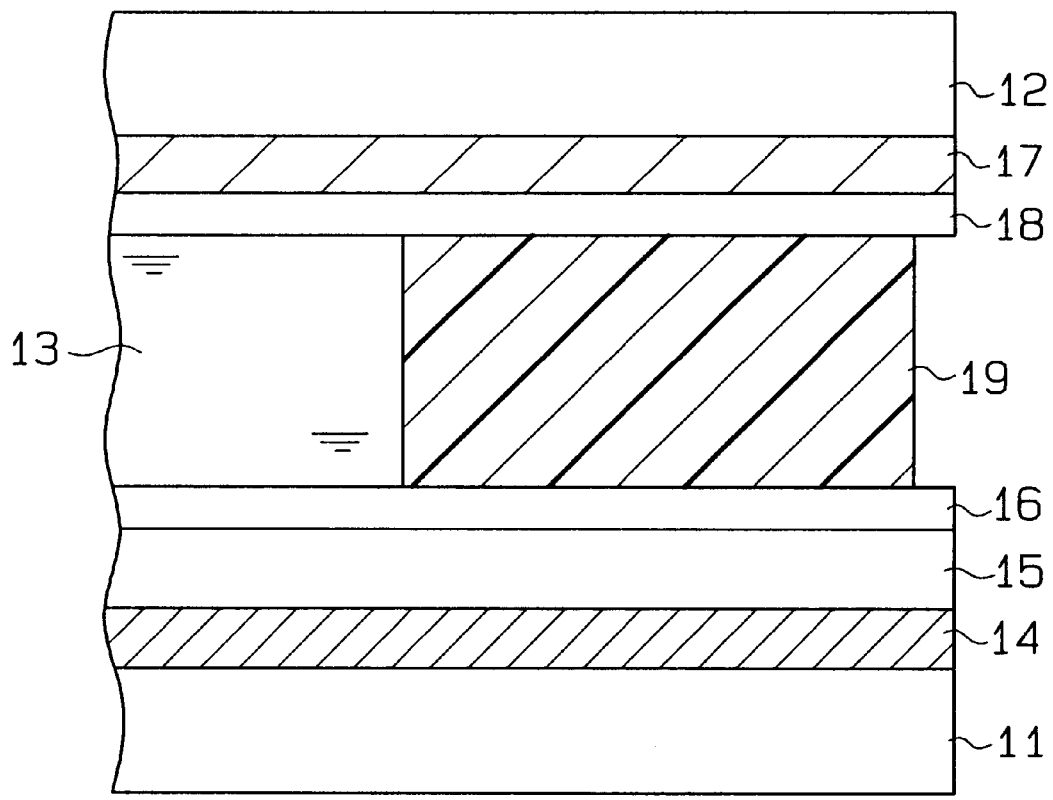
FIG. 3 is a partial cross-sectional view of a conventional liquid crystal display device.
Figure 4:
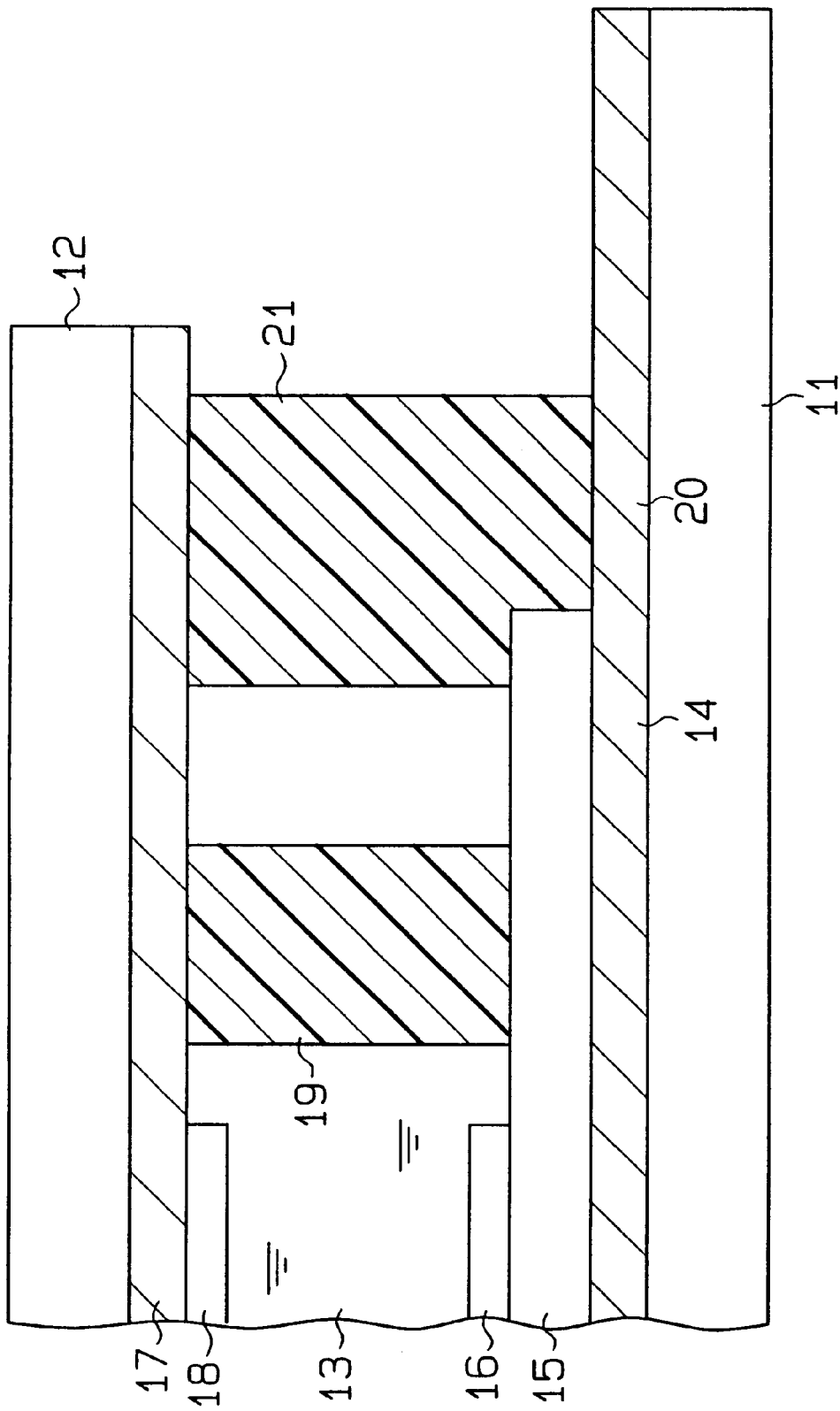
FIG. 4 is a partial cross-sectional view of a second conventional liquid crystal display device.

Referring to FIG. 9, a liquid crystal display device 230 according to a fourth embodiment of the present invention is different in the following points from the third embodiment of FIG. 8:

(1) A transparent conductive film or an ITO film 41 is formed on the contact hole 32 and inter-layer insulating film 15 at the edge of the first insulative substrate 11. That is, the opposite electrode 17 is connected to the contact pad 20 via the conductive beads 31 and the ITO film 41. The voltage Vcom applied to the contact pad 20 is applied to the opposite electrode 17 via the ITO film 41 in the contact hole 32 and the conductive material coated on the surface of the respective conductive beads 31. The ITO film 41 is preferably formed simultaneously with the display electrode (FIG. 2) of the liquid crystal cell which is made of the ITO film. The ITO film 41 is more resistant to corrosion than the aluminum alloy film 14 and improves corrosion resistance. Further, the ITO film 41 improves contact between the conductive beads 31 and aluminum alloy film 14.

It should be apparent to those skilled in the art that the present invention may be embodied in many other specific forms without departing from the spirit or scope of the invention. Particularly, it should be understood that the invention may be embodied in the following forms. For example, the aluminum alloy film 14 may be replaced by a film made of any metal with a high melting point. The planarizing insulation film 15 may be formed by silicone oxide, SOG (Spin On Glass), various silicate glass (BSG, PSG or BPSG), silicon nitride or various kinds of organic insulative material. Therefore, the present examples and embodiments are to be considered as illustrative and not restrictive and the invention is not to be limited to the details given herein, but may be modified within the scope and equivalence of the appended claims.

What is claimed is:

1. A liquid crystal display device, comprising:

first and second insulative substrates arranged opposite to each other;

a liquid crystal layer provided between the first and second insulative substrates;

a supplementary layer located on the first insulative substrate, the supplementary layer having at least one slit formed near a peripheral portion thereof which exposes a portion of the first insulative substrate;

a planarizing insulation film located on the supplementary layer and on the exposed portion of the first insulative substrate; and a sealing material provided between the planarizing insulation film and the second insulative substrate to seal the liquid crystal layer.

2. The liquid crystal display device of claim 1, wherein the supplementary layer includes at least two projections provided on both sides of the at least one slit.

3. The liquid crystal display device of claim 1, wherein the supplementary layer comprises a conductive layer.

4. The liquid crystal display device of claim 3, wherein the conductive layer forms a portion of the signal wiring of the liquid crystal display device.

5. The liquid crystal display device of claim 3, wherein the conductive layer comprises an aluminum alloy layer.

6. The liquid crystal display device of claim 1, wherein the supplementary layer comprises an aluminum alloy layer.

7. The liquid crystal display device of claim 1, wherein the planarizing insulation film comprises an acrylic resin film.

* * * * *

UNITED STATES PATENT AND TRADEMARK OFFICE
CERTIFICATE OF CORRECTION

PATENT NO.    : 5,953,094
DATED         : September 14, 1999
INVENTORS     : Matsuoka et al.

It is certified that error appears in the above-identified patent and that said Letters Patent is hereby corrected as shown below:

On page 1, under the heading Foreign Applicatioln Priority Date,
please delete "8-086997" and insert thereof --9-086997--,
please delete "8-089482" and insert thereof --9-089482--.

Signed and Sealed this

Seventh Day of March, 2000

Attest:

Q. TODD DICKINSON

*Attesting Officer*          *Commissioner of Patents and Trademarks*